United States Patent [19]

Takahashi et al.

[11] Patent Number: 5,469,216
[45] Date of Patent: Nov. 21, 1995

[54] APPARATUS AND METHOD FOR PROCESSING A DIGITAL VIDEO SIGNAL TO PRODUCE INTERPOLATED DATA

[75] Inventors: Kenji Takahashi, Tokyo; Tetsujiro Kondo, Kanagawa, both of Japan

[73] Assignee: Sony Corporation, Tokyo, Japan

[21] Appl. No.: 351,200

[22] Filed: Nov. 30, 1994

[30] Foreign Application Priority Data

Dec. 3, 1993 [JP] Japan ..................... 5-339541

[51] Int. Cl.⁶ ........................ H04N 7/12; H04N 7/01
[52] U.S. Cl. .................... 348/441; 348/421; 348/399
[58] Field of Search ........................... 348/420, 421, 348/394, 409, 411, 412, 415, 400, 441, 426, 397, 399, 426, 432; H04N 7/12, 7/01, 7/20

[56] References Cited

U.S. PATENT DOCUMENTS

| | | | |
|---|---|---|---|
| 4,546,386 | 10/1985 | Matsumoto et al. | 348/412 |
| 4,591,908 | 5/1986 | Hirano | 348/412 |
| 4,703,352 | 10/1987 | Kondo | 348/421 |
| 5,023,715 | 6/1991 | Owada et al. | 348/421 |
| 5,040,060 | 8/1991 | Owada et al. | 348/421 |
| 5,070,402 | 12/1991 | Ishii et al. | 348/421 |
| 5,307,177 | 4/1994 | Shibata et al. | 348/420 |

*Primary Examiner*—James J. Groody
*Assistant Examiner*—Michael H. Lee
*Attorney, Agent, or Firm*—William S. Frommer; Alvin Sinderbrand

[57] ABSTRACT

Apparatus and method for processing a digital video signal having an inner block of pixel data that represents an image spatially located within an outer block of pixel data. A class code of the inner block of pixel data is determined in accordance with values of the pixels of both the inner and outer blocks; and coefficient data which corresponds to the class code of the inner block is retrieved from a memory and is used with the digital video signal to generate interpolated data to produce, for example, a high definition digital video signal.

20 Claims, 3 Drawing Sheets

APPARATUS AND METHOD FOR PROCESSING A DIGITAL VIDEO SIGNAL TO PRODUCE INTERPOLATED DATA

BACKGROUND OF THE INVENTION

The present invention relates to a digital image signal processing apparatus and, more particularly, to apparatus and method for interpolating a digital video signal to produce interpolated video data.

Various techniques for compressing a digital video signal to be recorded or transmitted are known. One such technique is to perform multiplexing sub-Nyquist sampling encoding which is used in the so-called MUSE system, and which consists of "thinning" out (i.e., removing) selected pixels from the digital video signal prior to its transmission and interpolating (i.e., generating) the "thinned" out pixels from the transmitted pixels in a receiving system which receives the compressed digital video signal.

It has been proposed to "up-convert" a standard definition digital video signal to a high definition digital video signal (HDTV) by utilizing pixels in the standard definition signal to produce high definition pixels. Such interpolation may be accomplished by "predicting" the interpolated pixel value using values of known adjacent pixels in the standard definition digital video signal. One technique, known as class categorization, produces an "address" or "class code" from values of pixels which are adjacent to a pixel to be interpolated, and a predicted pixel value of the interpolated data, or coefficient data used to generate the interpolated pixel, is stored in a memory at a location identified by the class code. For example, a class code may be generated from four 8-bit pixel values of pixels in a "block" of data which are adjacent to a pixel to be interpolated and which produce a 32-bit class code. However, since there are $2^{32}$ possible class codes, which require an inordinate amount of memory, the value of each pixel is compressed (e.g., to 3-bits) before the class code is generated.

One method, known as adaptive dynamic range coding (ADRC), compresses pixel values from, for example, 8-bits to 3-bits. In ADRC processing of pixels, the maximum and minimum values of pixels that are each adjacent to a pixel to be interpolated are obtained, and the difference between the minimum and maximum pixel values constitutes the dynamic range of the block. The pixels are normalized by reducing their values by the minimum pixel value of the block, and the normalized pixel values are quantized by the dynamic range of the block thereby producing 3-bit values. The four 3-bit pixel values are utilized to form a 12-bit class code having 4096 possible values.

When the class code of a block of pixels is obtained, four coefficients $w_1$ to $w_4$ that correspond to this class code are used to generate a value "x" of the interpolated pixel using the following equation (1), where a, b, c and d are the respective values of the four known pixels.

$$x = aw_1 + bw_2 + cw_3 + dw_4 \qquad (1)$$

One disadvantage with the above-described method of classifying a block of pixels is the non-utilization of an important class code. Specifically, when a block is "flat", that is, when the values of all of the pixels in the block are the same, the dynamic range (DR) of the block is zero, thereby resulting in the compressed pixel value of either (000) or (111) for each pixel in the block. In this instance, the class code of the block is either (000000000000) or (111111111111), and thus, these two class codes are not utilized effectively since they both may represent the same "flat" block.

Another disadvantage with the above-described method of classifying a block of pixels is the general inability to distinguish "flat" blocks that have different pixel values. Namely, pixels in a first block whose values are equal to a first value are normalized and quantized to a minimum value and pixels in a second block whose values are equal to a second value are normalized and quantized also to the same minimum value.

OBJECTS OF THE INVENTION

Therefore, it is an object of the present invention to provide apparatus and method for processing a digital video signal to produce interpolated data which overcomes the shortcomings of the above described method.

Another object of the present invention is to provide apparatus and method for processing a digital video signal which classifies blocks of video data in a manner which effectively utilizes all class codes.

A further object of the present invention is to classify blocks of video data in a manner which distinguishes flat blocks having different pixel values from one another.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, apparatus and method for processing a digital video signal operate to receive a digital (e.g., standard definition) video signal having an inner block of pixel data that represents an image spatially located within an image represented by an outer block of pixel data, determine a class code of the inner block of pixel data in accordance with values of the pixels of both the inner and outer blocks, retrieve coefficient data from a memory at an address which corresponds to the class code of the inner block, and generate interpolated data from the received digital video signal (e.g., the outer block) and the retrieved coefficient data to produce, for example, a high definition digital video signal.

As one aspect of the present invention, the pixels in the inner block are normalized by the minimum pixel value of the outer block and are quantized by a dynamic range of the outer block of pixel data.

As another aspect of this invention, the class code of the inner block is the minimum class code when all pixel values of the inner block are the same and are less than a center value of the dynamic range of the outer block, and the class code of the inner block is the maximum class code when all pixel values of the inner block are the same and are greater than the center value of the dynamic range of the outer block.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 1:
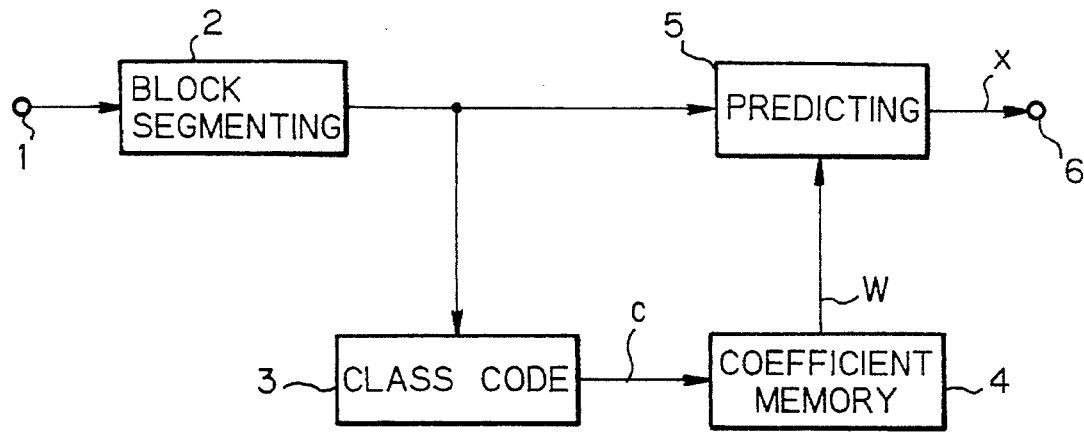
FIG. 1 is a block diagram of apparatus for processing a digital video signal in which the present invention finds ready application.

Referring now to the drawings, FIG. 1 is a block diagram of apparatus for processing a digital video signal in accordance with the present invention which produces interpolated data from a digital video signal and which is comprised of a block segmenting circuit 2, a class code circuit 3, a coefficient memory 4 and a predicting circuit 5. A digital video signal (e.g., a standard definition digital video signal) is supplied to an input terminal 1 and is received by block segmenting circuit 2 which converts the video data in the digital video signal into blocks of video pixels which correspond to blocked portions of a video image displayed on, for example, a television monitor. Block segmenting circuit 2 supplies each block of video pixels to class code circuit 3 and to predicting circuit 5. Class code circuit 3 generates a class code "c" for each supplied block of video pixels in accordance with the present invention (to be described) and supplies the generated class codes "c" to coefficient memory 4 which supplies stored coefficient data W to predicting circuit 5 that corresponds to each class code. Predicting circuit 5 generates interpolated data representing an interpolated pixel for each block from the block of video pixels supplied from block segmenting circuit 2 and from the supplied coefficient data (to be further described) and supplies the interpolated data "x" to an output terminal 6. In addition, predicting circuit 5 may combine the supplied blocks of video pixels with the interpolated data to produce a digital video signal having a higher resolution than the supplied standard definition digital video signal, for example, a high definition digital video signal.

Figure 2:
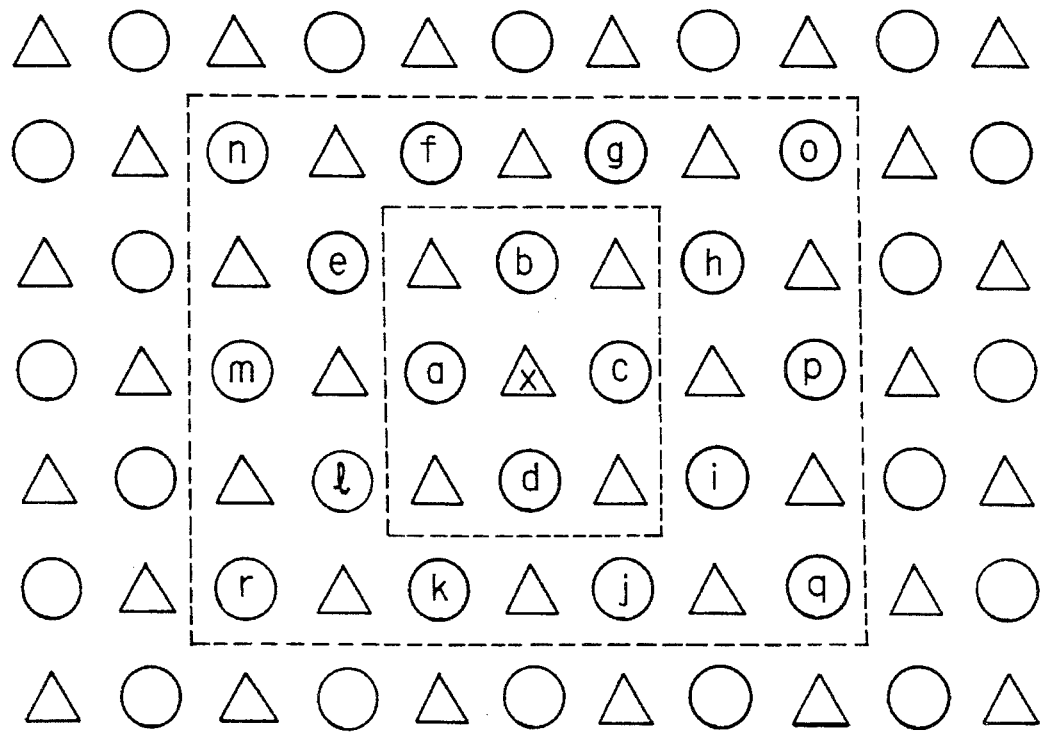
FIG. 2 is a schematic diagram illustrating inner and outer pixel blocks of a digital video signal in accordance with the present invention.

FIG. 2 is a schematic illustration of supplied and interpolated video pixels. As shown, each circle "o" represents a video pixel in the digital video signal supplied to block segmenting circuit 2 (i.e., the original video image) and each triangle "Δ" represents a video pixel that is generated (i.e., interpolated) in accordance with the present invention. Each triangle "Δ" may also represent a video pixel that has been "thinned" out (i.e., removed) from the digital video signal before the latter is transmitted or supplied. As previously described, block segmenting circuit 2 supplies blocks of video pixels to class code circuit 3, and as illustrated in FIG. 2, the supplied data includes an outer block of video pixels in which an inner block of video pixels is contained. For example, the outer block may be comprised of a 7 by 5 matrix of pixels (that includes both supplied and interpolated pixels), and the inner block may be comprised of a 3 by 3 matrix of pixels (that includes both supplied and interpolated pixels).

Figure 3:
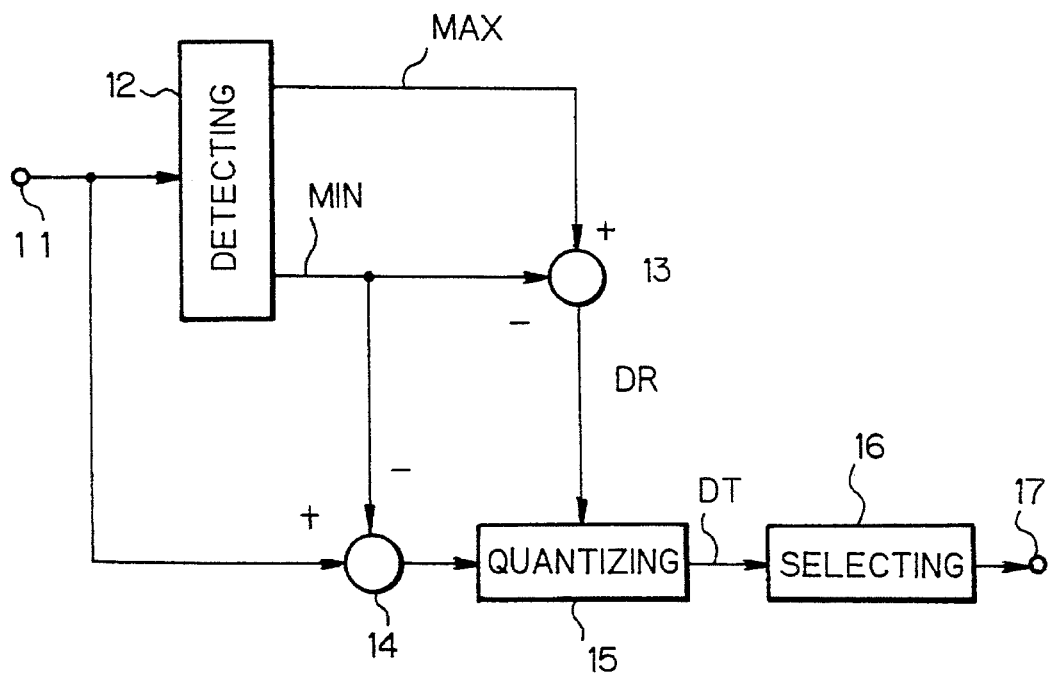
FIG. 3 is a block diagram of a code classification circuit in accordance with the present invention.

The generation of a class code of a block of video pixels in accordance with the present invention will now be described with reference to the code classification circuit (class code circuit 3) shown in FIG. 3. Block segmenting circuit 2 supplies a block of pixel data that includes an outer block and an inner block of pixels to an input terminal 11 of class code circuit 3. The block of pixel data may include, for example, pixels a to r illustrated in FIG. 2. The block of pixel data is supplied to a detecting circuit 12 which detects the minimum pixel value MIN and the maximum pixel value MAX of the pixels in the supplied block, and supplies values MIN and MAX to differencing circuit 13 and supplies value MIN to differencing circuit 14. Differencing circuit 13 supplies to a quantizing circuit 15 the difference DR between the maximum pixel value MAX and the minimum pixel value MIN.

The block of pixel data supplied to terminal 11 also is supplied to differencing circuit 14 which reduces the values of each of the pixels in the block by the minimum pixel value MIN supplied from detecting circuit 12 thereby producing normalized pixel data. Differencing circuit 14 supplies the normalized pixel data to quantizing circuit 15 which quantizes the latter by the dynamic range DR to produce compressed pixel values DT. For example, when the value of each pixel is 8-bits long, quantizing circuit 15 compresses the value of each pixel to 3-bits. Quantizing circuit 15 supplies the compressed. (e.g., 3 bit) values DT to a selecting circuit 16 which selects the values of the pixels in the inner block, for example, pixels a to d, to be the class code and which supplies the class code at output terminal 17.

In another embodiment of the present invention, only values of pixels in the inner block are quantized and then selected to be the class code. In addition, the class code may be generated from pixels in a preceding video field wherein a dynamic range of a block in one field is used to quantize blocks of pixels in another field. Further, instead of normalizing the pixels by reducing their values by the minimum pixel value MIN in differencing circuit 14, the pixels may be normalized by obtaining the difference between their values and the maximum pixel value MAX.

As described above, class code circuit 3 generates a class code "c" for each inner block of pixels (e.g., pixels a, b, c and d shown in FIG. 2) by quantizing normalized values of those pixels by the dynamic range DR of the outer block of pixels (e.g., pixels a to r). The present invention effectively utilizes all possible class codes and more accurately classifies the blocks with respect to the above-described known method since inner blocks of pixels, whose values ultimately constitute the class code, are normalized and quantized with respect to values of pixels in larger "outer" blocks of pixels. In addition, since values of the interpolated pixels are generated by utilizing values of pixels in outer blocks (to be described), there are no drawbacks in utilizing (i.e., processing) outer blocks to determine class codes of inner blocks.

In a further embodiment of the present invention, the class code of a block (e.g., inner block) of pixels that have the same pixel value (i.e., a "flat" block) is determined in accordance with whether the pixel values are greater than or less than the midpoint (i.e., center) of the dynamic range DR. That is, when all of the pixels in the inner block have the same pixel value "X" and the midpoint of the dynamic range DR of the outer block is "Y", then the class code of the inner block is the minimum class code (e.g., (000)) when X<Y, and the class code of the inner block is the maximum class code (e.g., (111)) when X>Y. Therefore, both the minimum and maximum class codes are effectively utilized and "flat" blocks which have small and large pixel values are distinguished from one another.

Returning to FIG. 1, class code circuit 3 supplies the class code "c" of each block to coefficient memory 4 which supplies coefficient data W, for example, coefficients $w_1$ to $w_{18}$, to predicting circuit 5 as a function of the class code of the block. Predicting circuit 5 calculates (i.e., interpolates) the value of a pixel "x" (FIG. 2) by means of the linear combination, represented by the equation (2), of the supplied coefficients (e.g., $w_1$ to $w_8$) and the values of the pixels supplied from block segmenting circuit 2 (e.g., pixel values a to r).

$$x = aw_1 + bw_2 + cw_3 + \ldots + qw_{17} + rw_{18} \tag{2}$$

Predicting circuit 5 supplies the interpolated pixel data "x" at output terminal 6. In addition, a high definition digital video signal that includes the blocks of video data supplied to predicting circuit 5 and the interpolated data may be supplied at output terminal 6.

Figure 4:
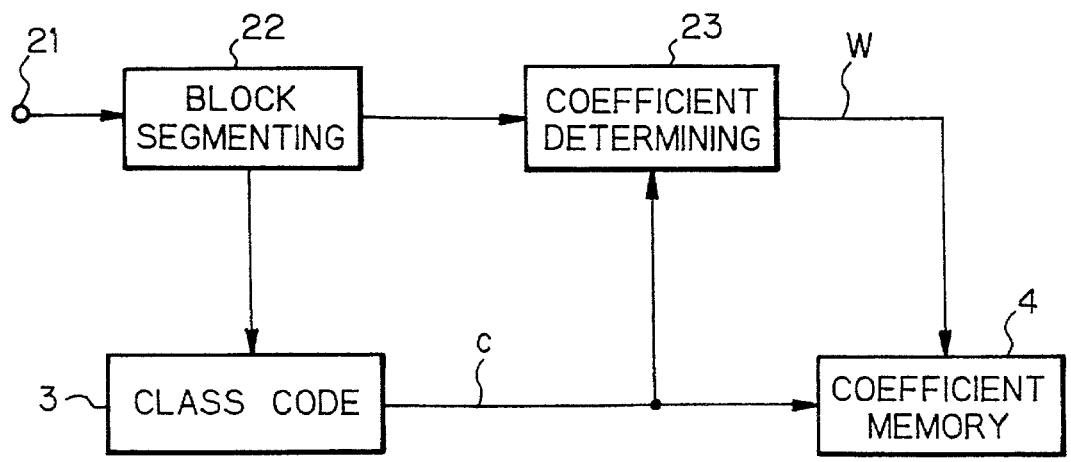
FIG. 4 is a block diagram of a "learning" circuit in accordance with the present invention.

The manner in which coefficient data is generated ("learned") for each class code is described with reference to the block diagram of FIG. 4. A reference standard definition digital video signal is supplied by way of an input terminal 21 to a block segmenting circuit 22 which block segments the video signal in a manner similar to that performed by block segmenting circuit 1, that is, block segmenting circuit 22 converts the video data in the digital video signal into blocks of video pixels as shown, for example, in FIG. 2. Block segmenting circuit 22 supplies the segmented block to class code circuit 3 and to a coefficient determining circuit 23. In addition, the actual reference value "x" of a pixel to be interpolated from the block of video pixels during the previously described interpolation process is supplied to coefficient determining circuit 23.

Class code circuit 3 generates the class code "c" for the supplied block of video pixels in accordance with the present invention (previously described) and supplies the generated class code "c" to coefficient determining circuit 23 and to coefficient memory 4. Coefficient determining circuit 23 generates coefficient data "W", for example, coefficients $w_1$ to $w_{18}$, from the supplied block of video pixels, the class code "c" of the supplied block and the actual value "x" of the pixel to be interpolated (further described below). Coefficient determining circuit 23 supplies the coefficient data "W" to coefficient memory 4 which stores the latter at a memory address which corresponds to the class code "c".

The process of generating and storing coefficient data (the "learning" process) will now be described with reference to the flowchart of FIG. 5. The "learning" process begins at step 31 and proceeds to instruction 32 at which point blocked data (for example, as shown in FIG. 2) is formed from a reference digital video signal. At inquiry 33, it is determined if all of the received data, e.g., one video frame of data, is completely processed, and if so, the process proceeds to instruction 36. If not, the class code of each block of data is determined at instruction 34 in accordance with the present invention and a "normal" equation for each block is generated at instruction 35 (to be described). The "learning" process then returns to instruction 32.

When all of the received data is processed (e.g., blocked, code classified and the "normal" equations generated), coefficient data is generated in the manner described below and stored in coefficient memory 4 at instructions 36 and 37, respectively. The "learning" process then is terminated at instruction 38.

The process of generating the "normal" equation (step 35) and generating the coefficient data (step 36) will now be described. Equation (3) represents an interpolation formula wherein y' is the interpolated value of a pixel, $w_1$ to $w_n$ are the coefficient data for a given class code "c", and $x_1$ to $x_n$ are the respective values of pixels (e.g., pixels "a" to "r" shown in FIG. 2) to be used in the interpolation process. The values of coefficients $w_1$ to $w_n$ are unknown.

$$y' = w_1 x_1 + w_2 x_2 + \ldots + w_n x_n \tag{3}$$

Equation (3) is generated for each class. When the amount of data equals m, the equations generated at step 35 are represented by equation (4).

$$y'_j = w_1 x_{j1} + w_2 x_{j2} + \ldots + w_n x_{jn} \tag{4}$$

j=1, 2, 3 . . . m.

However, when m > n, coefficients $w_1$ to $w_n$ cannot be uniquely obtained, and therefore, elements $e_j$ of an error vector E are determined using equation (5) and the square of error vector E is determined using equation (6) in order to generate coefficients $w_1$ to $w_n$ that minimize error vector E.

$$e_j = y_j - (w_1 x_{j1} + w_2 x_{j2} + \ldots + w_n x_{jn}) \tag{5}$$

j=1, 2, 3 . . . m.

$$E^2 = \sum_{j=0}^{m} \{e_j\}^2 \tag{6}$$

The method of least-squares is employed in equation (6) and the square of error vector E is differentiated with respect to $w_i$ (i=1 to n) as shown in equation (7).

$$\frac{\delta E^2}{\delta w_i} = \sum_{j=0}^{m} 2\left(\frac{\delta e_j}{\delta w_i}\right) e_j = \sum_{j=0}^{m} 2 x_{ji} \cdot e_j \tag{7}$$

When the value of the differential of $E^2$ with respect to $w_i$ is set to zero, values of the pixels $X_j$ (j=1 to m) and the interpolated pixel Y for each value of i are shown in equations (8) and (9), respectively.

$$X_{ji} = \sum_{p=0}^{m} x_{pi} \cdot x_{pj} \tag{8}$$

$$Y_i = \sum_{j=0}^{m} x_{ji} \cdot y_j \tag{9}$$

Figure 5:
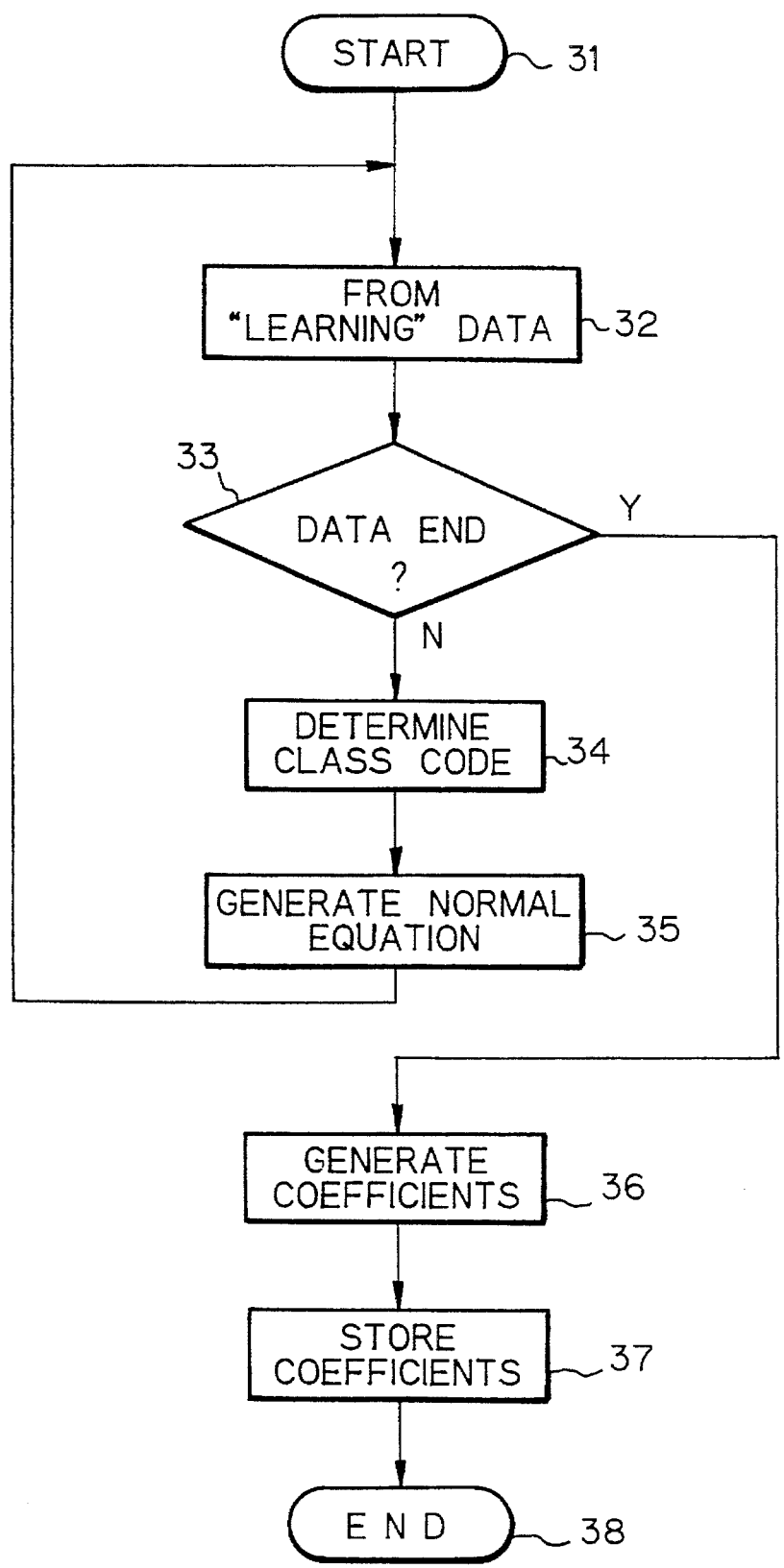
FIG. 5 is a flow chart of the "learning" process of the present invention.

The expression of Equations (8) and (9) in matrix form is shown in equation (10) which is referred to as the "normal" equation and which is generated at step 35 in the flowchart shown in FIG. 5. Equation (10) is solved with respect to $w_i$ by conventional matrix solving methods, for example, the sweep-out method. Coefficients $W_1$ to $W_n$ are stored in coefficient memory 4 at an address which corresponds to the class code.

$$\begin{bmatrix} X_{11} & X_{12} & \ldots & X_{1n} \\ X_{21} & X_{22} & \ldots & X_{2n} \\ \cdot & \cdot & & \cdot \\ \cdot & \cdot & & \cdot \\ \cdot & \cdot & & \cdot \\ X_{n1} & X_{n2} & \ldots & X_{nn} \end{bmatrix} \begin{bmatrix} w_1 \\ w_2 \\ \cdot \\ \cdot \\ \cdot \\ w_n \end{bmatrix} = \begin{bmatrix} Y_1 \\ Y_2 \\ \cdot \\ \cdot \\ \cdot \\ Y_n \end{bmatrix} \tag{10}$$

In another embodiment of the present invention, instead of performing a linear combination using stored coefficients (e.g., equation (2)), the value of the interpolated pixel may be generated by categorizing the pixels surrounding the pixel whose value is to be interpolated and calculating the average pixel value of the pixels in the inner block. In addition, the normalized value [(y−B)/DR] may be utilized where y represents the actual value of the interpolated pixel and B and DR are the base value and dynamic range of the outer block, respectively.

While the present invention has been particularly shown and described in conjunction with preferred embodiments thereof, it will be readily appreciated by those of ordinary skill in the art that various changes and modifications may be made without departing from the spirit and scope of the invention. For example, although the present discussion is directed to standard definition digital video signals and high definition digital video signals, the present invention is not limited solely to these types of signals and may be widely applied to the interpolation of various other video signals.

Therefore, it is intended that the appended claims be interpreted as including the embodiments described herein, the alternatives mentioned above, and all equivalents thereto.

What is claimed is:

1. Apparatus for processing a digital video signal to produce interpolated data, comprising:

memory means for storing predetermined coefficient data for respective class codes of pixel data at addresses corresponding to said respective class codes;

means for receiving a digital video signal having an inner block and an outer block of pixel data, said inner block of pixel data representing an image spatially located within an image represented by said outer block of pixel data;

means for determining a class code of said inner block of pixel data in accordance with values of said pixels of both said inner and outer blocks of pixel data;

means for retrieving said coefficient data from said memory means from an address corresponding to said class code of said inner block of pixel data; and means for generating interpolated data from said received digital video signal and said retrieved coefficient data.

2. The apparatus of claim 1, wherein said means for determining a class code of said inner block of pixel data includes means for normalizing values of said inner block of pixel data by a minimum pixel value of said outer block of pixel data.

3. The apparatus of claim 1, wherein said means for determining a class code of said inner block of pixel data includes means for determining a dynamic range of said outer block of pixel data, means for quantizing said inner block of pixel data by said dynamic range of said outer block of pixel data to produce an inner block of quantized pixel data, and means for determining said class code of said inner block of pixel data in accordance with values of said inner block of quantized pixel data.

4. The apparatus of claim 1, wherein said means for determining a class code of said inner block of pixel data includes means for determining a dynamic range of said outer block of pixel data, means for quantizing said outer block of pixel data by said dynamic range of said outer block of pixel data to produce an outer block of quantized pixel data, and means for determining said class code of said inner block of pixel data in accordance with values of an inner block of quantized pixel data contained in said outer block of quantized pixel data.

5. The apparatus of claim 1, wherein said means for determining a class code of said inner block of pixel data is operable to determine said class code to be a minimum class code when all values of said inner block of pixel data are the same and are less than a center value of a dynamic range of said outer block of pixel data, and is operable to determine said class code to be a maximum class code when all values of said inner block of pixel data are the same and are greater than a center value of said dynamic range of said outer block of pixel data.

6. The apparatus of claim 1, wherein said digital video signal is a standard definition digital video signal; and said apparatus further comprises means for combining said interpolated data with said standard definition digital video signal to produce a high definition digital video signal.

7. The apparatus of claim 1, wherein said means for generating is operable to generate said interpolated data from said outer block of pixel data and said retrieved coefficient data.

8. The apparatus of claim 1, wherein said coefficient data includes a plurality of coefficients and said received digital video signal includes a plurality of pixel data; and wherein said means for generating interpolated data is operable to generate said interpolated data by adding respective products of a respective one of said coefficients and a respective one of said pixel data.

9. The apparatus of claim 1, wherein said coefficient data stored in said memory means represents interpolated pixel data for each of said class codes.

10. The apparatus of claim 1, further comprising means for producing coefficient data associated with reference interpolated data for each of a plurality of respective class codes in accordance with a reference high definition digital video signal which includes a reference standard definition digital video signal and said reference interpolated data, and for storing said produced coefficient data in said memory means.

11. Method of processing a digital video signal to produce interpolated data, comprising the steps of:

storing predetermined coefficient data for respective class codes of pixel data in a memory at addresses corresponding to said respective class codes;

receiving a digital video signal having an inner block and an outer block of pixel data, said inner block of pixel data representing an image spatially located within an image represented by said outer block of pixel data;

determining a class code of said inner block of pixel data in accordance with values of said pixels of both said inner and outer blocks of pixel data;

retrieving said coefficient data from said memory from an address corresponding to said class code of said inner block of pixel data; and generating interpolated data from said received digital video signal and said retrieved coefficient data.

12. The method of claim 11, wherein said step of determining a class code of said inner block of pixel data includes the step of normalizing values of said inner block of pixel data by a minimum pixel value of said outer block of pixel data.

13. The method of claim 11, wherein said step of determining a class code of said inner block of pixel data includes the steps of determining a dynamic range of said outer block of pixel data, quantizing said inner block of pixel data by said dynamic range of said outer block of pixel data to produce an inner block of quantized pixel data, and determining said class code of said inner block of pixel data in accordance with values of said inner block of quantized pixel data.

14. The method of claim 11, wherein said step of determining a class code of said inner block of pixel data includes the steps of determining a dynamic range of said outer block of pixel data, quantizing said outer block of pixel data by said dynamic range of said outer block of pixel data to produce an outer block of quantized pixel data, and determining said class code of said inner block of pixel data in accordance with values of an inner block of quantized pixel data contained in said outer block of quantized pixel data.

15. The method of claim 11, wherein said step of determining a class code of said inner block of pixel data is carried out by determining said class code to be a minimum class code when all values of said inner block of pixel data are the same and are less than a center value of a dynamic range of said outer block of pixel data, and by determining said class code to be a maximum class code when all values of said inner block of pixel data are the same and are greater than a center value of said dynamic range of said outer block of pixel data.

16. The method of claim 11, wherein said digital video signal is a standard definition digital video signal; and said method further comprises the step of combining said interpolated data with said standard definition digital video signal to produce a high definition digital video signal.

17. The method of claim 11, wherein said step of generating interpolated data is carried out by generating said interpolated data from said outer block of pixel data and said retrieved coefficient data.

18. The method of claim 11, wherein said coefficient data includes a plurality of coefficients, and said received digital video signal includes a plurality of pixel data; and wherein said step of generating interpolated data is carried out by adding respective products of a respective one of said coefficients and a respective one of said pixel data.

19. The method of claim 11, wherein said coefficient data stored in said memory represents interpolated pixel data for each of said class codes.

20. The method of claim 11, further comprising the steps of producing coefficient data associated with reference interpolated data for each of a plurality of respective class codes in accordance with a reference high definition digital video signal which includes a reference standard definition digital video signal and said reference interpolated data, and storing said produced coefficient data in said memory.

* * * * *